Aug. 11, 1936.  W. W. PHILLIPS  2,050,731
MEANS OF ADJUSTING THE WIDTH OF WALKING CULTIVATORS
Filed May 10, 1934  2 Sheets-Sheet 1
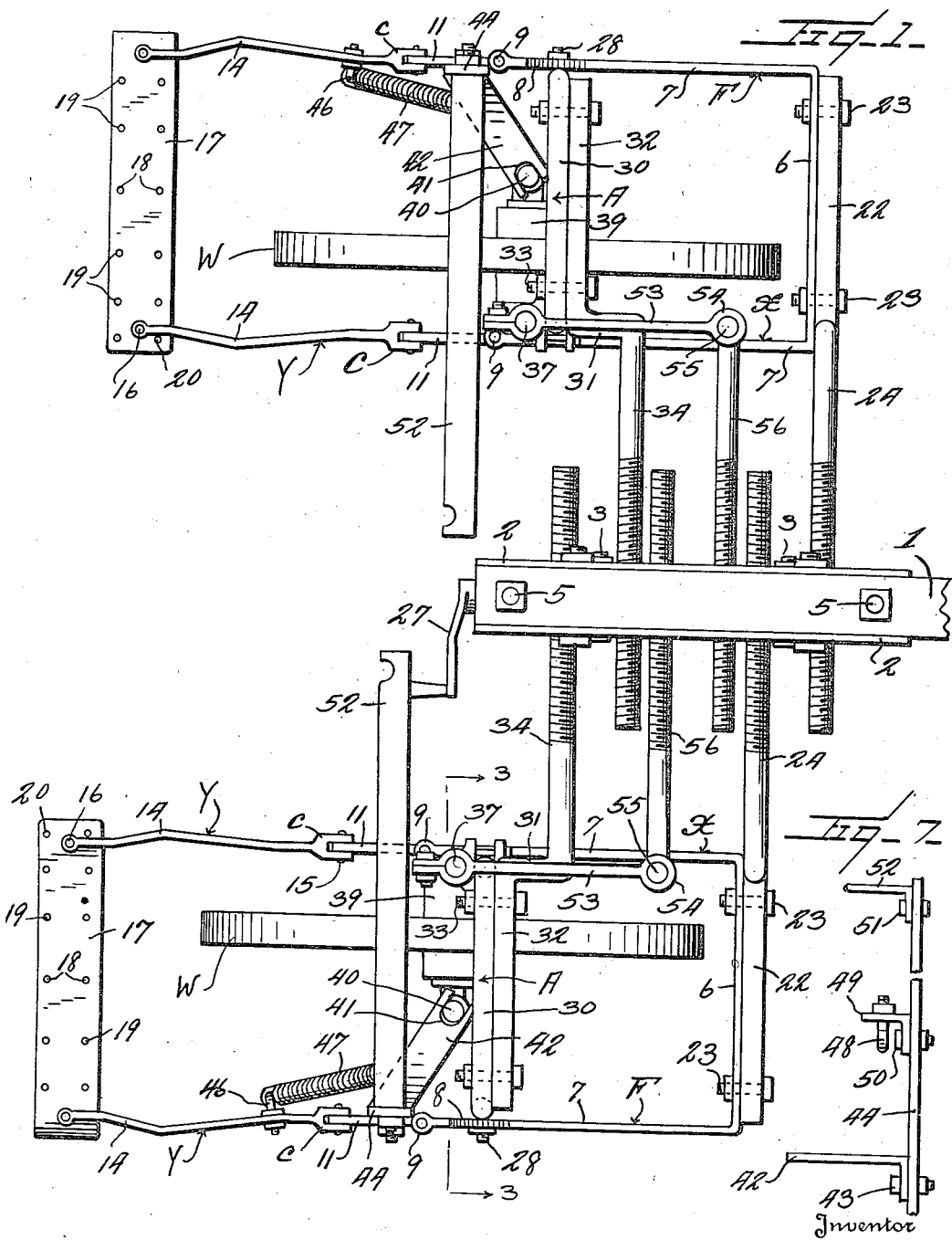
Inventor
W. W. Phillips
By Watson E. Coleman
Attorney

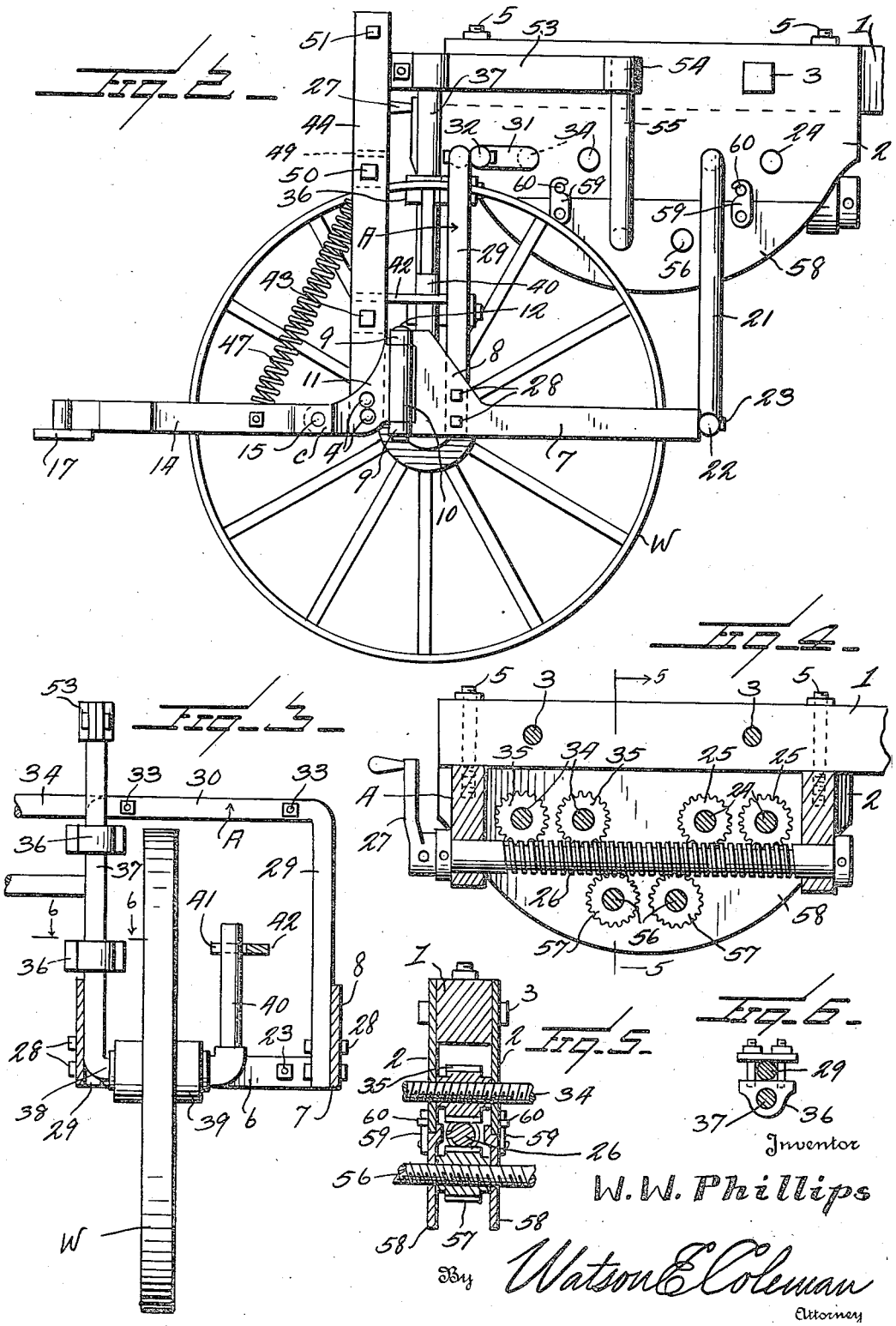

Patented Aug. 11, 1936

2,050,731

UNITED STATES PATENT OFFICE 2,050,731

MEANS OF ADJUSTING THE WIDTH OF WALKING CULTIVATORS

Walter W. Phillips, Hiram, Ga.

Application May 10, 1934, Serial No. 724,869

9 Claims. (Cl. 97—138)

This invention relates to cultivators and it is primarily an object of the invention to provide means whereby the width of the cultivator may be adjusted as the requirements of practice may prefer.

It is also an object of the invention to provide a cultivator constructed in a manner which provides for ready and convenient adjustment between the wheels of the implement, said adjustment being effected by a mechanism carried by the tongue of the implement.

The invention also has for an object to provide a walking cultivator constructed in a manner whereby the width of the cultivator may be readily adjusted together with means for simultaneously adjusting the ground engaging members with the adjustment of the implement proper so that the ground engaging members will be properly set irrespective of the adjustment of the implement.

The invention consists in the details of construction and in the combination and arrangement of the several parts of my improved cultivator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a cultivator constructed in accordance with an embodiment of my invention, the ground working members being omitted;

Figure 2 is a view in side elevation of the structure as illustrated in Figure 1;

Figure 3 is a detailed sectional view taken substantially on the line 3—3 of Figure 1 looking in the direction of the arrows with parts in elevation;

Figure 4 is a fragmentary view partly in side elevation and partly in section illustrating the crank operated mechanism herein disclosed for obtaining the desired adjustments;

Figure 5 is a detailed sectional view taken substantially on the line 5—5 of Figure 4 looking in the direction of the arrows;

Figure 6 is a fragmentary detailed sectional view taken substantially on the line 6—6 of Figure 3 looking in the direction of the arrows;

Figure 7 is a fragmentary view in elevation of one of the uprights or columns carried by a coupling plate together with the parts secured to such column or upright.

As disclosed in the accompanying drawings, 1 denotes a draft tongue having overlying its side faces at the rear thereof the plates 2. These plates, as herein disclosed, are held in position by the bolts 3 extending through the tongue 1 and the overlying portions of the plates 2. The plates 2 depend a desired distance below the lower face of the tongue 1 and also depending from the tongue 1 between the plates 2 and adjacent the opposite ends thereof are the plates or bearings 4. These bearings or plates 4 are held to the under surface of the tongue 1 by the bolts 5.

The tongue 1 is arranged substantially midway between two frames F, each of which comprising a front frame section X and a rear frame section Y. The front section X, as herein disclosed, is U-shaped in form with the intermediate member 6 thereof forwardly disposed. The outer extremities of the rearwardly disposed side members 7 of the front section X are upwardly enlarged, as at 8. Each of these portions 8 may be termed a plate and extending rearwardly therefrom in vertically spaced relation are the knuckles 9 between which is snugly fitted a knuckle 10 at an end portion of a coupling plate 11. Disposed through the knuckles 9 and 10 is a pivot pintle 12 whereby the coupling plate 11 is connected to a member 7 or more particularly the rear plate 8 thereof for swinging movement in a horizontal direction or in a direction laterally of the frame section X. The opposite end portion of the coupling plate 11, as herein disclosed, is received within a clevis c provided at the forward end portion of a side member 14 of the rear frame section Y and which section may also be termed the tool carrying section. This clevis c is pivotally connected to its associated plate 11 by the horizontally disposed pintle 15 whereby vertical swinging movement of the section Y is permitted with respect to the plate 11 when the cultivator is in use.

The outer or rear end portions of the side members 14 are connected, as at 16, to the end portions of a wide flat transverse member 17. This member 17 substantially midway between the connecting point 16 for the side members 14 is provided with the openings 18 to permit the attachment of a handle of an ordinary type to the member 17, and at opposite sides of the openings 18 the member 17 is provided with the openings 19 to provide for the desired attachment of the plows or other desired ground working members while the inner extremity of the member 17 is provided with the openings 20 to permit the securement thereof of a fender.

The transverse member 6 of each of the sections X is provided adjacent the inner side member 7 with an upstanding member or post 21. As herein disclosed the lower end of this post is provided with a lateral extension 22 which is disposed along the outer face of the member 6 and bolted, as at 23, or otherwise secured thereto. The upper end of the member or post 21 is continued to provide an outwardly and laterally disposed rod 24 which extends through the depending portions of the plates 2. The major portion of the rod 24 is threaded and operatively engaged with said threaded portion is a worm wheel 25 meshing with a worm shaft 26. This shaft 26 extends between and is rotatably supported by the plates or bearings 4. The worm wheel 25 snugly engages between the plates 2 so that upon rotation of the worm shaft 26 the rod 24 will be moved inwardly or outwardly depending upon the direction of rotation of the worm shaft 26. An end portion of the shaft 26 extends beyond the rear plate or bearing 4 and to said extended portion is fixed a crank 27 or other suitable operating member whereby the shaft 26 may be readily rotated as desired.

It is to be stated at this time that the rod 24 of one frame F is reversely threaded with respect to the rod 24 of the second frame so that upon rotation of the shaft 26 both of the frames will be simultaneously moved outwardly or inwardly with respect to each other and to the tongue 1.

The rear portions of the side members 7 have bolted, as at 28, or otherwise secured thereto the extremities of the side members 29 of an arch member or frame A. The upper transverse or intermediate member 30 of each of the arch members or frames A carries a short forwardly directed arm 31, said arm 31 being continued along its inner end by an extension 32 extending along the member 30 and bolted, as at 33, or otherwise attached thereto. The outer end of this arm 31 is continued by an outwardly and laterally disposed rod 34 which extends beyond the inner side of the associated frame section X and is of a length to extend through the depending portions of the plates 2. These rods 34 also have their major portions threaded and engaged upon said threaded portions are the worm gears 35 in mesh with the worm shaft 26.

The rod 34 associated with one of the frames F is oppositely threaded with respect to the rod 34 of the second frame F to assure opposite endwise movement of the rods 34 upon rotation of the shaft 26 whereby the outward or inward movement of the frames F one with respect to the other and with respect to the tongue 1 is further accomplished.

Clamped or otherwise positioned upon the inner side member 29 of each of the arches or frames F are the vertically spaced bearings 36 through which is directed a vertically disposed shaft or axle 37, the lower end portion of which carrying a laterally directed stub axle 38 extending inwardly of the frame F or more particularly the frame section X. Rotatably mounted upon this stub axle 38 is a ground engaging wheel W.

The stub axle 38 extends beyond the hub 39 of the wheel W and at the side of the wheel remote from the shaft or axle 37 the stub axle 38 is continued by an upstanding or vertical control arm 40. The arm 40 freely engages within a kerf or open slot 41 provided in the outer or free end portion of a flat arm 42 extending inwardly of the frame section X and carried by and secured to, as at 43, a vertically disposed column or upright 44. The lower end portion of this column or upright 44 is bolted or otherwise rigidly secured, as at 45, to the coupling plate 11 at the outer side of the frame F. This arm 42 as is believed to be clearly apparent, will serve to impose steering movement to the associated wheel W in accordance with the lateral swinging movement which may be given to the frame section Y whereby the travel of the implement is facilitated and which is of particular advantage in making a short turn. To facilitate the desired manipulation of each of the rear or tool carrying frame sections Y, the outer side member 14 of each of said sections Y at a desired point therealong carries an inwardly disposed eye member 46 to which is suitably affixed an end portion of a retractile coil spring 47 of desired tension. The opposite end portion of this spring is anchored to an eye member 48 depending from the inwardly directed bracket 49, said bracket being bolted or otherwise secured, as at 50, to the upper portion of the adjacent column or upright 44.

The top portion of each of the columns or uprights 44 has bolted thereto, as at 51, or otherwise secured thereto an end portion of an elongated arm 52. This arm 52 extends inwardly and transversely of the associated frame F and terminates in close proximity to a tongue 1.

The two arms 52 are adapted to have secured thereto the lines or reins leading from the draft animals so that as lateral movement is given to the frames Y together, of course, with the plates 11 the resultant swinging movement of the arms 52 will result in the desired pull being given to the proper line or rein thus controlling the travel of the draft animals without requiring the manipulation of the lines or reins by the operator, allowing him to concentrate upon his work.

The upper portion of each of the shafts or axles 37 carries a forwardly directed arm 53, the forward end portion of which being pivotally or hingedly engaged, as at 54, with the upper end portion of a vertically disposed post 55 carried by an end portion of an elongated rod 56. This rod 56 is of a length to extend below and beyond the plates 2. The major portion of this rod 56 is also threaded and has engaged thereon a worm gear 57 which is positioned between two supplemental plates 58. The upper edges of these plates 58 are straight as are also the lower edges of the plates 2 so that the plates 58 may have their upper edges snugly engaged with the lower edges of the plates 2 and detachably held to the plates 2 by the locking members as is particularly illustrated in Figure 2 of the drawings. As illustrated in this figure the locking members comprise the hooks 59 pivotally engaged with the auxiliary plates 58 and which swing over and engage the outstanding lugs 60 extending outwardly from the lower portions of the plates 2. When the plates 58 are in applied position with respect to the plates 2 the worm gear 57 of each of the rods 56 meshes with the shaft 26. The rods 56 are also reversely threaded so as to have desired unitary endwise movement. The plates 58 together with the rods 56 are applied at the time the frames F are to be adjusted in accordance with the widths of the rows between which it is desired to cultivate because during such adjustment it is of importance that provision be made to stabilize the movement of the wheels W with the frames. With the wheels set straight ahead it is believed to be obvious that as the frames are moved outwardly or inwardly one with respect to the other or with respect to the tongue t the wheels W will be maintained in such set position.

After the frames F have been properly set, the plates 58 are disengaged from the plates 2 and as the posts 55 are freely directed through the outer end portions of the arms 53, the rods 56 and their associated parts can be readily removed as a unit and, of course, reapplied when required with the same facility.

From the foregoing description it is thought to be obvious that a cultivator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a walking cultivator having a draft tongue, plates secured to the rear portion of the tongue and depending therefrom, said plates being spaced apart transversely of the tongue, bearings depending from the tongue at points fore and aft of the space between the plates, a shank rotatably supported by the bearings, said shank being threaded between the bearings, a frame including a forward transverse member and rearwardly disposed side members, an upstanding member carried by the front member of the frame at the inner side thereof, an outwardly and laterally disposed rod, said rod being directed through the depending portions of the plates, said rod being threaded to mesh with the threaded portion of the shank, an upstanding frame substantially in the form of an inverted U having the lower portions of its side members secured to the rear portions of the side members of the first frame, said second frame providing a mounting for ground engaging means, a forwardly directed arm carried by the intermediate member of the second frame at the inner end portion thereof, an outwardly and laterally disposed rod carried by the outer portion of the arm and extending through the depending portions of the plates on the tongue, said last named rod being threaded and meshing with the threaded portion of the shank, and means for rotating the shank to adjust the frames laterally toward or from the tongue.

2. In combination with a walking cultivator having a draft tongue, plates secured to the rear portion of the tongue and depending therefrom, said plates being spaced apart transversely of the tongue, bearings depending from the tongue at points fore and aft of the space between the plates, a shank rotatably supported by the bearings, said shank being threaded between the bearings, a frame including a forward transverse member and rearwardly disposed side members, an upstanding member carried by the front member of the frame at the inner side thereof, an outwardly and laterally disposed rod, said rod being directed through the depending portions of the plates, said rod being threaded to mesh with the threaded portion of the shank, an upstanding frame substantially in the form of an inverted U having the lower portions of its side members secured to the rear portions of the side members of the first frame, said second frame providing a mounting for ground engaging means, a forwardly directed arm carried by the intermediate member of the second frame at the inner end portion thereof, an outwardly and laterally disposed rod carried by the outer portion of the arm and extending through the depending portions of the plates on the tongue, said last named rod being threaded and meshing with the threaded portion of the shank, means for rotating the shank to adjust the frames laterally toward or from the tongue, a tool carrying frame section having side members, and means for connecting the side members of the tool frame section to the rear end portions of the side members of the first frame, said means being so constructed and arranged to allow relative movement of the first frame and the frame section in both substantially a horizontal direction and a vertical direction.

3. In combination with a walking cultivator having a draft tongue, a shaft rotatably mounted upon the tongue, frames at opposite sides of the tongue, each of said frames comprising two sections, the rear section constituting a tool carrying section, ground engaging means carried by the second section, means for connecting the two sections of the frame to permit said sections to have relative swinging movement in a vertical direction and in a lateral direction one with respect to the other, members carried fore and aft of the second section of each of the frames and extending laterally in a direction toward the tongue, and means carried by the tongue supporting said members for endwise movement and in driven connection with the shaft, rotation of the shaft giving endwise movement to said members to adjust the frames one toward or from the other in a direction laterally of the tongue.

4. In combination with a walking cultivator having a draft tongue, a shaft rotatably mounted upon the tongue, frames at opposite sides of the tongue, each of said frames comprising two sections, the rear section constituting a tool carrying section, ground engaging means carried by the second section, means for connecting the two sections of the frame to permit said sections to have relative swinging movement in a vertical direction and in a lateral direction one with respect to the other, members carried fore and aft of the second section of each of the frames and extending laterally in a direction toward the tongue, means carried by the tongue supporting said members for endwise movement and in driven connection with the shaft, rotation of the shaft giving endwise movement to said members to adjust the frames one toward or from the other in a direction laterally of the tongue, means for connecting the ground engaging means to their frame sections for steering movement, and means for holding the ground engaging means against steering movement during the period the frames are moved one toward or from the other.

5. In combination with a walking cultivator having a draft tongue, a shaft rotatably mounted upon the tongue, frames at opposite sides of the tongue, each of said frames comprising two sections, the rear section constituting a tool carrying section, ground engaging means carried by the second section, means for connecting the two sections of the frame to permit said sections to have relative swinging movement in a vertical direction and in a lateral direction one with respect to the other, members carried fore and aft of the second section of each of the frames and extending laterally in a direction toward the tongue, means carried by the tongue supporting said members for endwise movement. and in driven connection with the shaft, rotation of the shaft giving endwise movement to said members to adjust the frames one toward or from the other in a direction laterally of the tongue, means for connecting the ground engaging means to their frame sections for steering movement, and means for holding the ground engaging means against steering movement during the period the frames are moved one toward or from the other, said last named means being removable.

6. In combination with a walking cultivator having a draft tongue, a shaft rotatably mounted upon the tongue, frames at opposite sides of the tongue, each of said frames comprising two sections, the rear section constituting a tool carrying section, ground engaging means carried by the second section, means for connecting the two sections of the frame to permit said sections to have relative swinging movement in a vertical direction and in a lateral direction one with respect to the other, members carried fore and aft of the second section of each of the frames and extending laterally in a direction toward the tongue, means carried by the tongue supporting said members for endwise movement and in driven connection with the shaft, rotation of the shaft giving endwise movement to said members to adjust the frames one toward or from the other in a direction laterally of the tongue, means for connecting the ground engaging means to their frame sections for steering movement, means for holding the ground engaging means against steering movement during the period the frames are moved one toward or from the other, and means operated by the tool carrying sections for imparting steering movement to the ground engaging means upon lateral swinging movement of said tool carrying sections.

7. In combination with a walking cultivator having a draft tongue, a shaft rotatably mounted upon the tongue, frames at opposite sides of the tongue, each of said frames comprising two sections, the rear section constituting a tool carrying section, ground engaging means carried by the second section, means for connecting the two sections of the frame to permit said sections to have relative swinging movement in a vertical direction and in a lateral direction one with respect to the other, members carried fore and aft of the second section of each of the frames and extending laterally in a direction toward the tongue, means carried by the tongue supporting said members for endwise movement and in driven connection with the shaft, rotation of the shaft giving endwise movement to said members to adjust the frames one toward or from the other in a direction laterally of the tongue, means for connecting the ground engaging means to their frame sections for steering movement, means for holding the ground engaging means against steering movement during the period the frames are moved one toward or from the other, means operated by the tool carrying sections for imparting steering movement to the ground engaging means upon lateral swinging movement of said tool carrying sections, and rein pulling means movable with the laterally swinging frame sections.

8. A walking cultivator comprising, in combination, a draft tongue, frames arranged side by side and in spaced relation transversely of the tongue, each of said frames comprising two sections, the rear section constituting a tool carrying section, ground engaging members, means for connecting a ground engaging member to the second section of each of the frames for steering movement, means for connecting the two sections of each of the frames to permit said sections to have relative swinging movement in a vertical direction and in a lateral direction one with respect to the other, and means operated by the tool carrying sections for imparting steering movement to the ground engaging members upon lateral swinging movement of the tool carrying sections of the frames.

9. A walking cultivator comprising, in combination, a draft tongue, frames arranged side by side and in spaced relation transversely of the tongue, each of said frames comprising two sections, the rear section constituting a tool carrying section, ground engaging members, means for connecting a ground engaging member to the second section of each of the frames for steering movement, means for connecting the two sections of each of the frames to permit said sections to have relative swinging movement in a vertical direction and in a lateral direction one with respect to the other, means operated by the tool carrying sections for imparting steering movement to the ground engaging members upon lateral swinging movement of the tool carrying sections of the frames, and rein pulling means movable with the tool carrying sections when said sections are shifted laterally.

WALTER W. PHILLIPS.